United States Patent
Carolan et al.

(10) Patent No.: US 6,753,887 B2
(45) Date of Patent: Jun. 22, 2004

(54) METHOD AND APPARATUS FOR DYNAMICALLY DISPLAYING BRAND INFORMATION IN A USER INTERFACE

(75) Inventors: Sean E. Carolan, Jackson, NJ (US); John W. Garrett, Neshanic Station, NJ (US); Charles Robert Kalmanek, Jr., Short Hills, NJ (US); Han Q. Nguyen, Marlboro, NJ (US); Kadangode K. Ramakrishnan, Berkeley Heights, NJ (US)

(73) Assignee: AT&T Corp., New York, NY (US)

( * ) Notice: Subject to any disclaimer, the term of this patent is extended or adjusted under 35 U.S.C. 154(b) by 523 days.

(21) Appl. No.: 09/812,442

(22) Filed: Mar. 20, 2001

(65) Prior Publication Data

US 2002/0036658 A1 Mar. 28, 2002

Related U.S. Application Data

(60) Provisional application No. 60/190,633, filed on Mar. 20, 2000.

(51) Int. Cl.[7] ............................. G09G 5/00; G06F 15/16
(52) U.S. Cl. ...................... 345/764; 345/733; 345/962; 709/219; 709/227
(58) Field of Search ............................... 345/962, 733, 345/738, 739, 764, 866; 705/1, 500; 709/217–219, 223–225, 227–229

(56) References Cited

U.S. PATENT DOCUMENTS

| | | | |
|---|---|---|---|
| 6,029,203 A | | 2/2000 | Bhatia et al. |
| 6,148,332 A | * | 11/2000 | Brewer et al. ............... 709/218 |
| 6,205,479 B1 | * | 3/2001 | Dulai et al. .................. 709/225 |
| 6,442,529 B1 | * | 8/2002 | Krishan et al. ................ 705/14 |
| 6,457,076 B1 | * | 9/2002 | Cheng et al. ................... 710/36 |
| 6,535,882 B2 | * | 3/2003 | Pasquali ....................... 707/10 |
| 6,542,943 B2 | * | 4/2003 | Cheng et al. .................. 710/36 |
| 6,615,263 B2 | * | 9/2003 | Dulai et al. .................. 709/225 |
| 2001/0007097 A1 | * | 7/2001 | Kim ............................. 705/14 |
| 2002/0099600 A1 | * | 7/2002 | Merriman et al. ............. 705/14 |

FOREIGN PATENT DOCUMENTS

| | | |
|---|---|---|
| WO | WO 98/24224 A | 6/1998 |
| WO | WO 99/33211 A | 7/1999 |
| WO | WO 99/52032 A | 10/1999 |
| WO | WO 00/05684 A | 2/2000 |

OTHER PUBLICATIONS

International Search Report dated Jul. 19, 2001 regarding International Application No. PCT/US 01/08846.
International Search Report dated Jul. 19, 2001 regarding International Application No. PCT/US/01/08849.
International Search Report dated Jul. 19, 2001 regarding International Application No. PCT/US 01/08841.

(List continued on next page.)

*Primary Examiner*—John Cabeca
*Assistant Examiner*—Brian Detwiler

(57) ABSTRACT

Client software may be used in conjunction with services offered by several entities such as network service providers. A user interface of the client software presents brand indicia relating to the network service provider that is currently being used by the software. The software is configured by selecting entities with which the software will be used. Once the entities are selected, an instruction server is queried to determine the location of branding data to be presented to the user, and a branding data server is queried to retrieve the branding data. The brand indicia are presented to the user according to the branding data each time the corresponding entity is accessed.

18 Claims, 9 Drawing Sheets

OTHER PUBLICATIONS

Perkins, C. E., et al. "Using DHCP with Computers that Move", *Wireless Networks*, ACM, US. vol. 1, No. 3, Oct. 1, 1995, pp. 341–353, and pp. 342, left hand column, line 22—p. 344, left–hand column, line 25, document defining the general state of the art which is not considered to be of particular relevance as to claim 12.

Blankers P: "Network Solution for Internet Access Services" *Ericsson Review*, S. E., Ericsson, Stockholm, No. spec. int. Iss. 1998, pp. 4–13, figures 7, 8, p. 11, right–hand column, line 24–p. 12, left–hand column, line 6, document defining the general state of the art which is not considered to be of particular relevance.

International Search Report dated Jul. 19, 2001 regarding International Application No. PCT/US 01/08985.

International Search Report dated Jul. 19, 2001 regarding International Application No. PCT/US 01/08986.

International Search Report dated Jul. 19, 2001 regarding International Application No. PCT/US 01/08822.

* cited by examiner

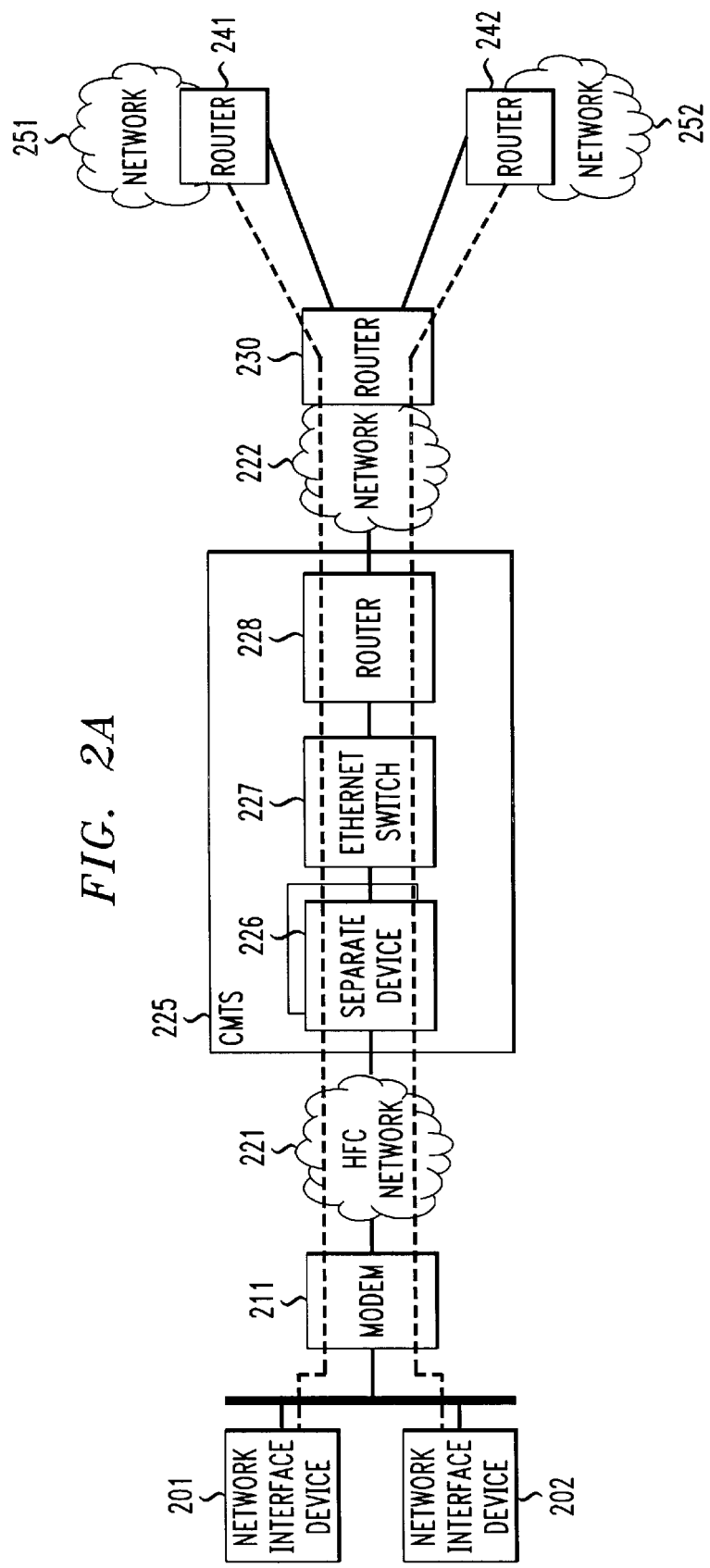

800

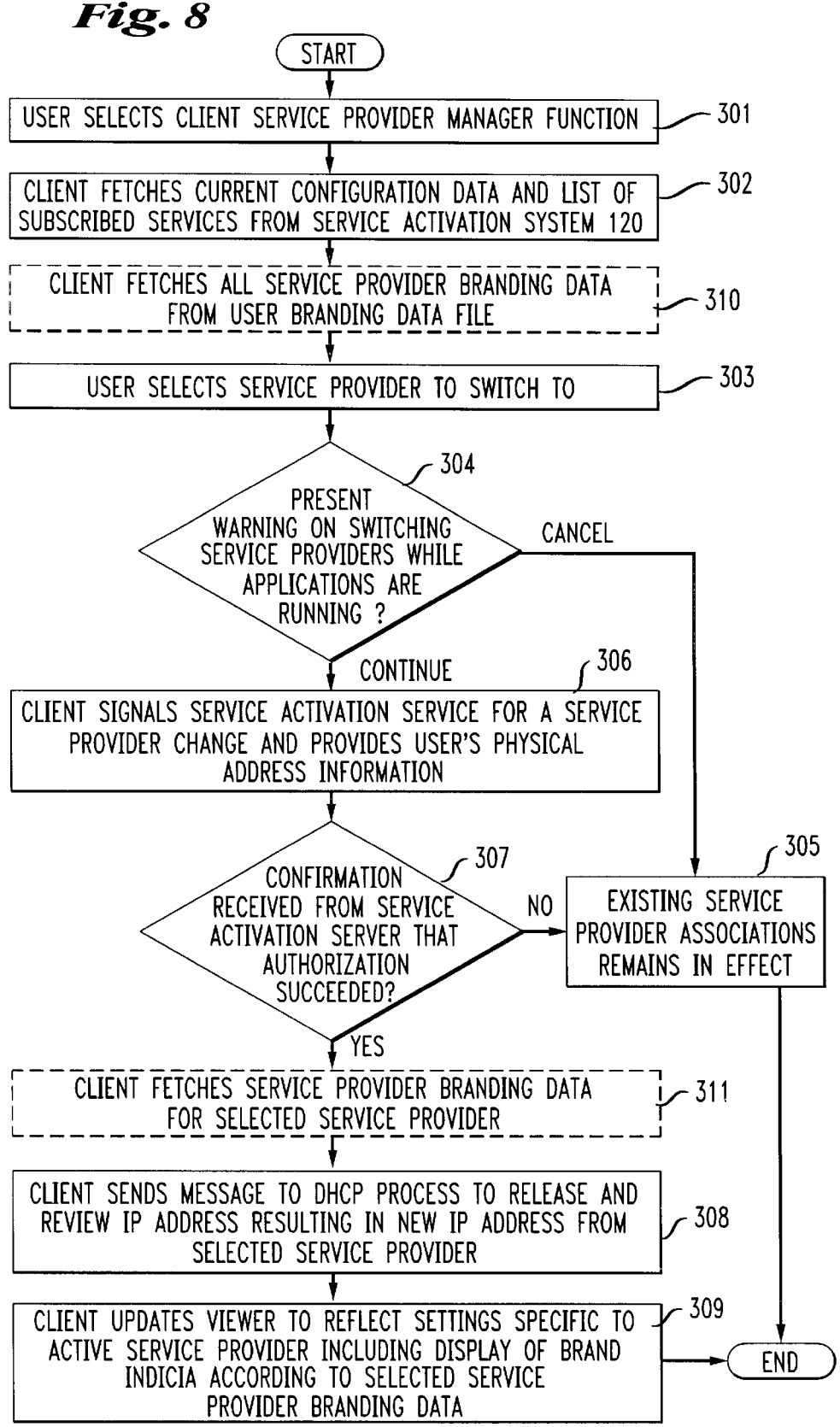

METHOD AND APPARATUS FOR DYNAMICALLY DISPLAYING BRAND INFORMATION IN A USER INTERFACE

CROSS REFERENCE TO RELATED APPLICATIONS

This application claims priority to Provisional Application Serial No. 60/190,633 entitled "Internet Service Selection over Cable," filed on Mar. 20, 2000, the content of which is incorporated by reference herein, and is related to U.S. patent application No. 60/190,632, entitled "METHOD AND APPARATUS FOR COORDINATING A CHANGE IN SERVICE PROVIDER BETWEEN A CLIENT AND A SERVER," filed on even date herewith, the content of which is incorporated by reference herein.

FIELD OF THE INVENTION

The present invention relates generally to software having a user interface with branding information, and, more particularly, to methods for changing the branding information to reflect specific uses of the software.

BACKGROUND OF THE INVENTION

It has become important for Internet-related services to maintain their brand identity in the increasingly competitive e-commerce market. This is especially important in cases where services to a consumer are essentially transparent. Without brand identity, such services become commodities, lacking differentiation to the consumer.

One example of an otherwise-transparent service that has maintained brand identity in the e-commerce market is that provided by an Internet service provider (ISP). An ISP provides a gateway for individual subscribers to access the Internet. The ISP may also provide other services, such as searching capabilities, email, customization and content available only to its subscribers.

Many ISP's do not provide their own proprietary client software. Instead, most ISP's provide to their subscribers a browser licensed from a third party, such as the proprietary Microsoft Explorer® and Netscape Navigator® browsers. Because the browser includes the user interface between the ISP and the subscriber, it is important to both the subscriber and the ISP that the identity of the ISP be conveyed through the third-party browser to the subscriber.

Many currently available browsers address this problem by providing a persistent region of the user interface screen reserved for brand indicia of the ISP. As used herein, a "persistent" region of the user interface screen is a region that remains visible to a user as the browser displays changing web content. The brand indicia displayed in such a region often take the form of a logo that becomes animated during periods of active communication between the ISP and the subscriber. The indicia clearly identify the ISP to the subscriber.

Third-party browser suppliers provide administration kits for customizing the proprietary browser for use by an individual ISP. Before distributing a third-party browser to its subscribers, an ISP may use the administration kit to place its logo in the persistent region of the user interface provided for that purpose. The ISP may thereafter lock access to those properties of the browser to prevent subscribers from changing them.

Under certain conditions, a single instance of a browser residing on a network access device such as a personal computer may be used to separately access multiple ISP's. For example, as described below, a network access device may be connected to an access network that has Internet connection services available from a plurality of ISP's, any of which may be chosen by the user for a given browsing session. The user may furthermore be given the capability to change ISP's during a browsing session. In those cases, there is a need for a mechanism for dynamically changing the branding indicia displayed on the browser's user interface to match the ISP in use at a given time.

Furthermore, a user of a dial-up connection may wish to subscribe to multiple ISP's. To correctly display ISP brand information in the user interface portion of the browser, a user must install multiple instances of one or more browsers. A similar problem arises where other types of client software are used in conjunction with the services of more than one service provider.

A browser that is dedicated to use with a single ISP is typically delivered to the ISP subscriber pre-configured for displaying the ISP's brand indicia. The pre-configured browser software contains static files with branding data such as images comprising the brand indicia to be displayed in the user interface. Such pre-configuration is not practical where the browser is to be used with multiple ISP's that are chosen by the user after the browser is installed on a given network access device. There is therefore a need for a method for retrieving branding data for selected ISP's for storage and later display when the browser is used to access a selected ISP. There is a similar need for a method to retrieve branding data for any client software that is used in conjunction with a plurality of network service providers.

SUMMARY OF THE INVENTION

It is an object of the present invention to enable a method of causing brand indicia of a selected network access provider to be presented through a user interface associated with client software. The software is configurable to be used in conjunction with one of a plurality of network access providers. In accordance with a method of the invention, an identification of a plurality of network access providers is initially received for configuration of the client software. Branding data containing brand indicia for the identified network access providers is then retrieved from at least one branding data server. One of the identified network access providers is then selected for use in a session. Brand indicia of the selected network access provider are then presented through the user interface of the client software according to the branding data.

In this method, the location of the at least one branding data server may be retrieved from an instruction server. The instruction server and the branding data server may be separate servers or may be the same server. The branding data may include a screen location in the user interface where brand indicia are to be displayed, and the brand indicia may include multimedia information. The branding data may be retrieved by a network access device, or by a service activation system. The branding data may be in HTML format.

The method may also include storing the branding data in a branding database. In that case, the branding data is retrieved from the branding database before it is presented through the user interface.

The client software may run on a network access device. The network access device is then assigned a network address allocated by the selected one of the identified network access providers.

The method may also include the steps of receiving a selection of a second network access provider, and causing the brand indicia of the second network access provider to be presented through the user interface of the client software according to the branding data.

Another aspect of the invention comprises a method of configuring a network access device having a first network address allocated to a subscriber of services of a first service provider provided by a first service network, with a new network address allocated to a subscriber of services of a second service provider provided by a second service network. The network access device is connected to an access network connected to a plurality of service networks. The network access device furthermore has a user interface for displaying brand indicia of a service network.

In this method, branding data containing brand indicia for the plurality of service networks is first retrieved from at least one branding data server. A request is then sent from the network access device to the access network requesting a change to a second service provider, and a response to that request is received from the access network. A network address change request is then initiated using a DHCP configuration protocol, in which a second network address allocated to the subscriber of services of the second service provider is assigned to the network access device. The second network address is utilized by the network access device to communicate data packets to the service network providing the selected service. Finally, brand indicia of the second service provider are presented through the user interface.

These and other advantages of the invention will be apparent to those of ordinary skill in the art by reference to the following detailed description and the accompanying drawings.

BRIEF DESCRIPTION OF THE DRAWINGS

FIG. 2A and FIG. 2B are conceptual representations of an exemplary embodiment illustrating principles of the invention based on an HFC access architecture with corresponding end-to-end protocol layers.

FIG. 8 is a flowchart of the actions of the service client in accordance with an embodiment of the invention.

DETAILED DESCRIPTION

Figure 1:
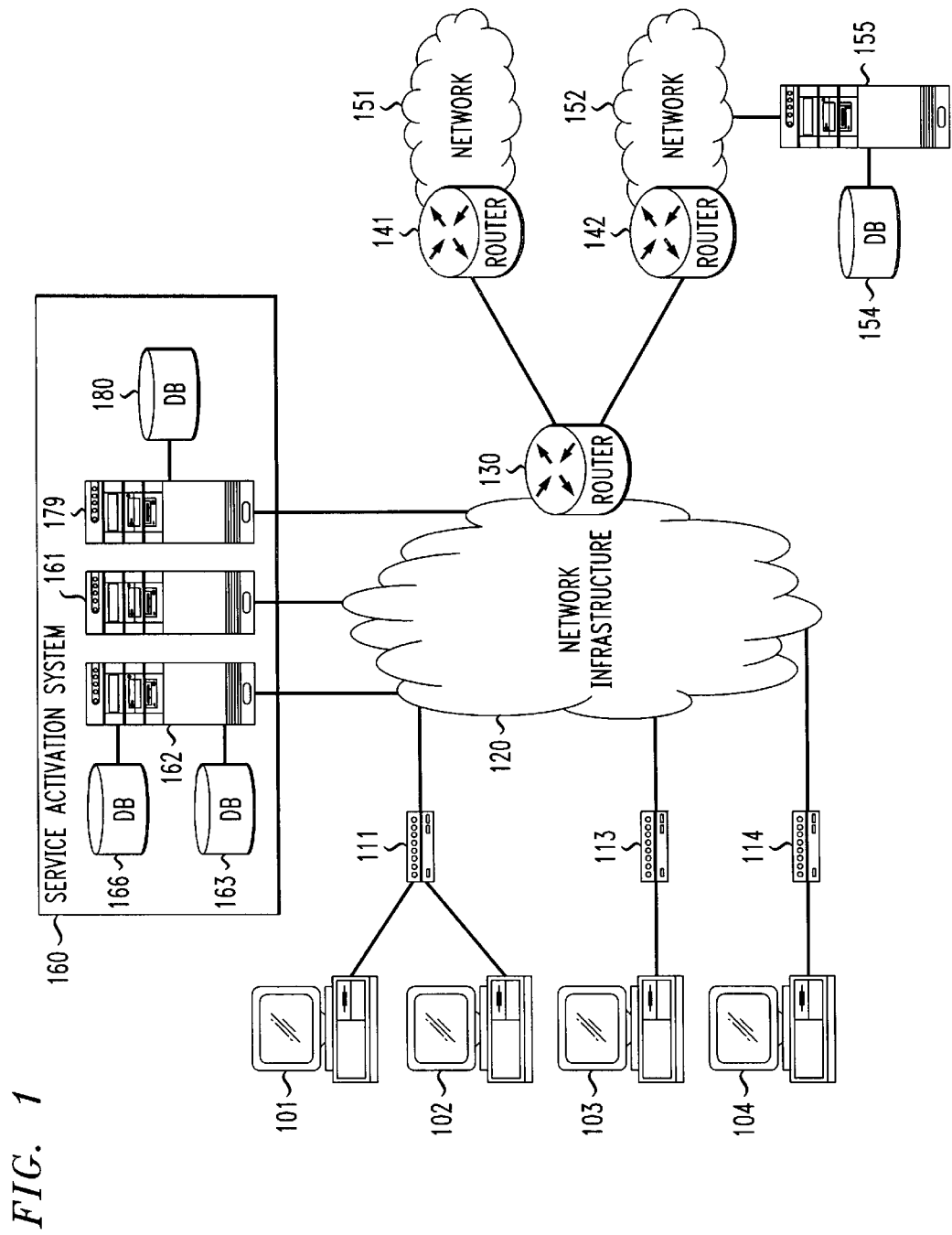
FIG. 1 illustrates an interconnection of packet-switched service networks and an access network embodying principles of the invention.

FIG. 1 illustrates an example of a network configuration wherein a single network access device (e.g., 101) may be used to access a plurality of service networks 151, 152. In such a configuration, a single instance of client software running on the network access device may be used to access a plurality of service networks such as ISP's providing network services. The method and system of the present invention relate to displaying brand indicia of the multiple service networks in a user interface of a browser in order to reflect which service network is currently being accessed. While the invention is described herein using the example embodiment of displaying brand indicia of an ISP in a browser, it should be understood that the invention is not so limited, and should instead be interpreted as applying to any case where client software is used in an environment where it becomes important to display a brand identity of a service with which the software is used.

In FIG. 1, a plurality of subscribers operating network access devices 101, 102, 103, . . . 104 are provided access to communication network services, which are facilitated by a plurality of packet-switched data networks, shown in FIG. 1 as 151 and 152. Packet-switched data networks 151 and 152, referred to herein as "service networks," offer access to different services and/or are operated by different service providers. For example, service network 151 could provide packet-switched connectivity to public data networks while service network 152 could offer packet-switched telephony service (or the same public data network connectivity, but from a different service provider). The service networks, as is well known in the art, utilize a network addressing scheme to route datagrams to and from hosts: for example, where the service networks utilize the TCP/IP protocol suite, Internet Protocol (IP) addresses are assigned to each host and utilized in the process of routing packets from a source to a destination in the networks. See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 1883 (December 1995), which are incorporated by reference herein. The invention shall be described herein with particular reference to the TCP/IP protocol suite and IP addresses, although those skilled in the art would readily be able to implement the invention using any of a number of different communication protocols.

The network access devices 101 . . . 104 are typically customer premises equipment (CPE) such as a personal computer, information appliance, personal data assistant, data-enabled wireless handset, or any other type of device capable of accessing information through a packet-switched data network. Each network access device 101 . . . 104 is either connected to or integrated with a network interface unit 111 . . . 114, e.g. a modem, which enables communication through an access network infrastructure, shown as 120 in FIG. 1. Each network access device is assigned an IP address, which, in accordance with an aspect of the invention, is associated with a particular service or service provider to which the user of the device is subscribed. For example, network access device 101 is assumed to have been assigned, for purposes of the description herein, an IP address associated with a service provider operating service network 151. As further described herein, it is advantageous to provide a service activation system 160 which permits the dynamic allocation, assignment, and reassignment of IP addresses to the plurality of network access devices based on customer subscriptions to particular services.

The network access device 101 communicates with the service network 151 through the access network infrastructure 120, which, in accordance with aspects of the invention, is capable of recognizing and directing traffic to the proper service network. The access network infrastructure 120 advantageously can be operated and maintained by an entity that is the same as or different from the entities operating and maintaining the service networks 151 and 152. In accordance with an embodiment of an aspect of the present invention, the different IP-based services offered by the different service networks 151 and 152 utilize shared layer one and layer two resources in the access network 120. Layer three routing procedures, however, are modified to permit IP traffic from network access device 101 to flow to the correct subscribed service network 151. The access network 120 has a router 130 on the edge of the access network. The router 130 has a first interface with a connection to a router 141 in service network 151 and a second interface with a connection to a router 142 in service network 152. As further described herein, the router processes packets and is capable of directing traffic to the proper service network.

Figure 2B:
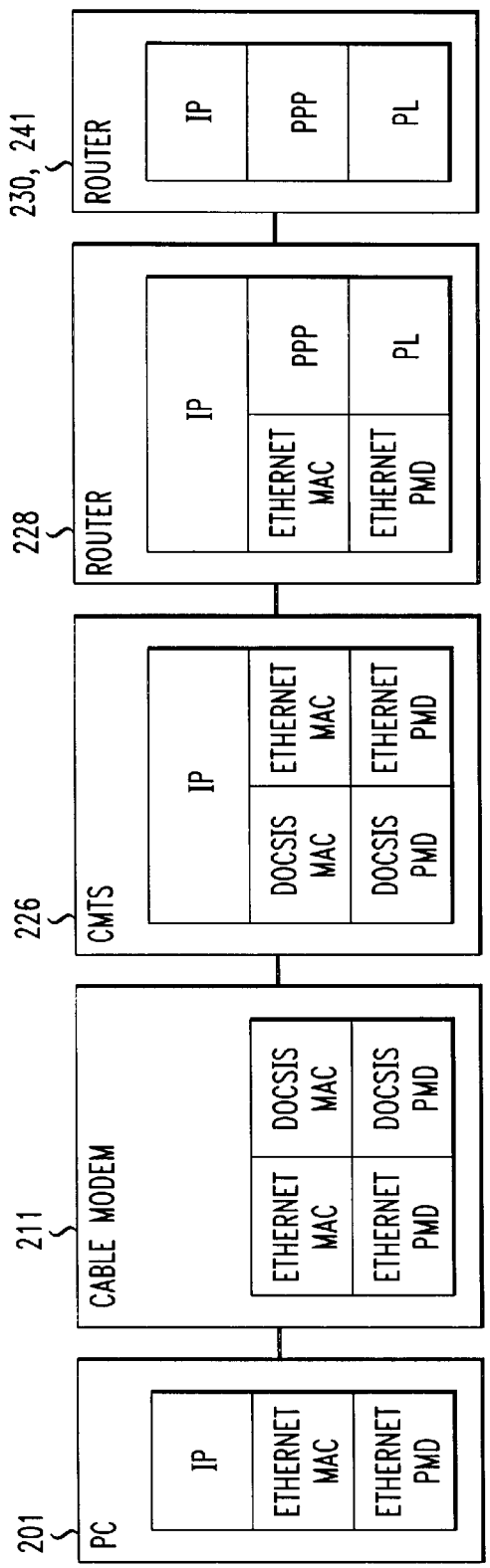

FIG. 2A shows an exemplary access architecture based on a hybrid fiber coaxial (HFC) access network. As is known in the art, each network interface device 201 . . . 202 is either connected to or integrated with a cable modem 211 which enables communication through the HFC network 221. In accordance with the Data Over Cable Service Interface Specification (DOCSIS), a Cable Modem Termination System (CMTS), shown as 225 in FIG. 2A, communicates with the cable modems 211 and manages access to both upstream and downstream cable capacity on the HFC networks 221. See, e.g., "Data-Over-Cable Service Interface Specifications: Cable Modem Termination System—Network Side Interface Specification," Cable Television Laboratories, Inc., SP-CMTS-NSI-I01-960702; "Data-Over-Cable Service Interface Specifications: Cable Modem to Customer Premise Equipment Interface Specification," Cable Television Laboratories, Inc., SP-CMCI-C02C-991015; "Data-Over-Cable Service Interface Specifications: Baseline Privacy Plus Interface Specifications," Cable Television Laboratories, Inc., SPB-PI+-I06-001215, which are incorporated by reference herein. The CMTS 225 manages the scheduling of both upstream and downstream transmission and allocates cable capacity to individual customers identified by a Service IDs (SIDs). The CMTS 225 can have an integrated router 228 or can be a separate device 226 that bridges to a fast Ethernet switch 227 which connects to the router 228. The IP router 228 provides connectivity to an IP network 222, which further comprises the router 230 (corresponding to router 130 in FIG. 1) which interfaces to IP routers 241 and 242 in service networks 251 and 252, respectively. Accordingly, the HFC network 221, the CMTS 225, and the IP network 222 correspond to the access network infrastructure 120 shown in FIG. 1. FIG. 2B shows a conceptual diagram of the end-to-end communication protocol stack from a network access device 201 (101) to a router 241 (141) in service provider's network 251 (151). As is known in the art, the lowest layer deals with the physical layer (PL) of the protocol stack, e.g. the Ethernet physical media device (PMD) layer; the second layer deals with the data link layer, e.g. the Ethernet Media Access Control (MAC) layer; which the third layer in the protocol stack deals with the network layer, e.g. the IP layer.

Router 130 in the access network 120 in FIG. 1 (corresponding to IP router 230 in FIG. 2) separates the IP traffic to/from the multiple services or service providers as well as combines traffic from the multiple service or service providers. In accordance with an aspect of the invention, IP packets are routed from network access device 101 to the subscribed service network 151 using source address-based policy routing. Conventional routing is destination-based: the router consults an internal routing table which maps the destination addresses of all inbound packets to a physical interface address for use for outgoing packets. Policy routing schemes, however, will selectively choose different paths for different packets even where the packet's destination address may be the same. Since network access devices are assigned addresses associated with a particular network service provider, the source address based policy routing scheme ensures packets from a network access device will go to the appropriate service network. Generally, the router receives an incoming packet, reads the packet header and retrieves the packet filtering rules, typically stored in an access list. The router then applies the packet filtering rules, and compares the source IP address in the packet header to a list of addresses allocated to subcribers to a first service provider, e.g. operating service network 151 in FIG. 1. If the source address matches one of these addresses, then the router forwards the packet to a router in service network 151, e.g. router 141 in FIG. 1. The router compares the source IP address in the packet header to a list of addresses allocated to subscribers of a second service provider, e.g. operating service network 152 in FIG. 1. If the source IP address matches one of these addresses, then the router forwards the packet to a router in service network 152, e.g. router 142 in FIG. 1. The router continues in this fashion with any other packet filtering rules identifying IP addresses allocated to subscribers of any other service providers. Assuming the IP source address does not match any such addresses associated with a service provider, the router applies any remaining packet filtering rules and routes or denies the packet accordingly.

The network access device (or "client") 101 includes, in an exemplary embodiment as a personal computer, a processing unit, memory, and a bus that interfaces the memory with the processing unit. The computer memory includes conventional read only memory (ROM) and random access memory (RAM). An input/output system (BIOS) contains the basic routines that help to transfer information between elements within the network access device 101 such as, for example, during start up. These are stored in the ROM. The network access device 101 may further include a hard disk drive, a magnetic disk (e.g., floppy disk) drive, and an optical disk drive (e.g., CD-ROM) in a conventional arrangement. The hard disk drive, magnetic disk drive and optical disk drive are coupled to the bus by suitable respective interfaces. The drives and associated computer-readable media provide nonvolatile storage for the network access device 101. The network interface unit 111 (211) as depicted in FIGS. 1 and 2 is coupled to an appropriate network interface communicating with the system bus.

Client software residing in the computer memory associated with any particular network access device 101 . . . 104 may provide a user interface for accessing several different communication network services at different times and in different browsing sessions. For example, browser software running on network access device 101 (FIG. 1) may serve as a user interface for accessing both service network 151 and service network 152.

Figure 3:
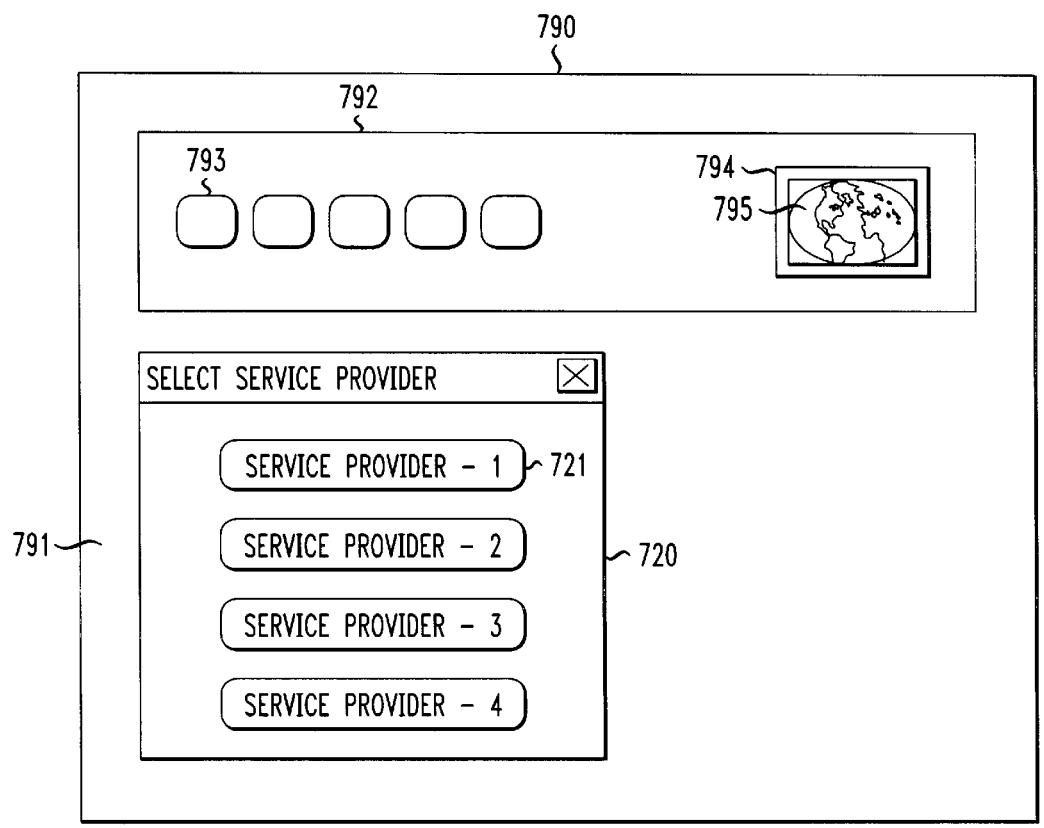
FIG. 3 is a diagram of a browser user interface showing the service provider manager function of the client software

A browser user interface 790, shown in FIG. 3, is an example of a user interface displayed by client software. The browser user interface contains an HTML display area 791. The remaining area of the browser is a persistent user interface area and includes bar 792 with buttons 793. A branding region 794 is provided in the user interface area for displaying brand indicia 795. The branding region may be located in the bar 792 as shown, or may be located elsewhere in the user interface area of the browser.

The browser user interface 790 provides a graphical user interface (GUI) and includes a service provider manager function or module that enables the user to switch between service providers (e.g., associated with networks 151, 152). The service provider manager function is enabled by selecting the appropriate button or control on the menu bar 792. This may be explicitly presented on a particular button 793 or such function can be part of a selection on a drop-down menu. The service provider management function of the client software permits the user to select a service provider from a list of subscribed service providers. In the embodiment depicted in FIG. 3, the service provider manager function has been selected by the user and a window 720 is generated that contains a plurality of choices, e.g., SERVICE PROVIDER-1, SERVICE PROVIDER-2, SERVICE PROVIDER-3, and SERVICE PROVIDER-4 (hereinafter described as svc-1, svc-2, etc). User credentials for each service provider may be cached within the client memory. The service provider manager can also offer to add new service providers in accordance with the user's selection, and update information may be downloaded as is well known in the art. As described herein, a subscriber to svc-1 has an IP address currently allocated to svc-1, and desires to change to svc-2. The process for effectuating this change will be described in more detail below.

It is advantageous to enable the IP addresses—which ultimately determine the service network utilized by the particular network access device—to be allocated and reassigned dynamically. With reference to FIG. 1, a service activation system 160 is shown which further comprises a configuration server 161, a registration server 162 and a branding instruction server 179 connected to the access network infrastructure 120. The registration server 162 provides a network-based subscription/authorization process for the various services shared on the access network infrastructure 120. A customer desiring to subscribe to a new service can access and provide registration information to the registration server 162, e.g. by using HTML forms and the Hyper Text Transfer Protocol (HTTP) as is known in the art. Upon successful service subscription, the registration server 162 updates a customer registration database 163 which associates the customer information including the customer's hardware address (e.g., the MAC address of the network access device 101) with the subscribed service, The registration server 162 is also preferably connected to a branding database 166 containing branding data downloaded from branding data servers 155 of the network service providers associated with networks 151 and 152.

The configuration server 161 uses the registration information to activate the service. The configuration server 161 is responsible for allocating network addresses on behalf of the service networks from a network address space associated with the selected service. In a preferred embodiment of this aspect of the invention, the configuration server 161 uses a host configuration protocol such as the Dynamic Host Configuration Protocol (DHCP) to configure the network addresses of the network access devices. See R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein. This aspect of the invention shall be described herein with particular reference to DHCP, and the configuration server 161 shall be referred to herein as the DHCP server, although those skilled in the art would readily be able to implement this aspect of the invention using a different protocol.

Figure 4:
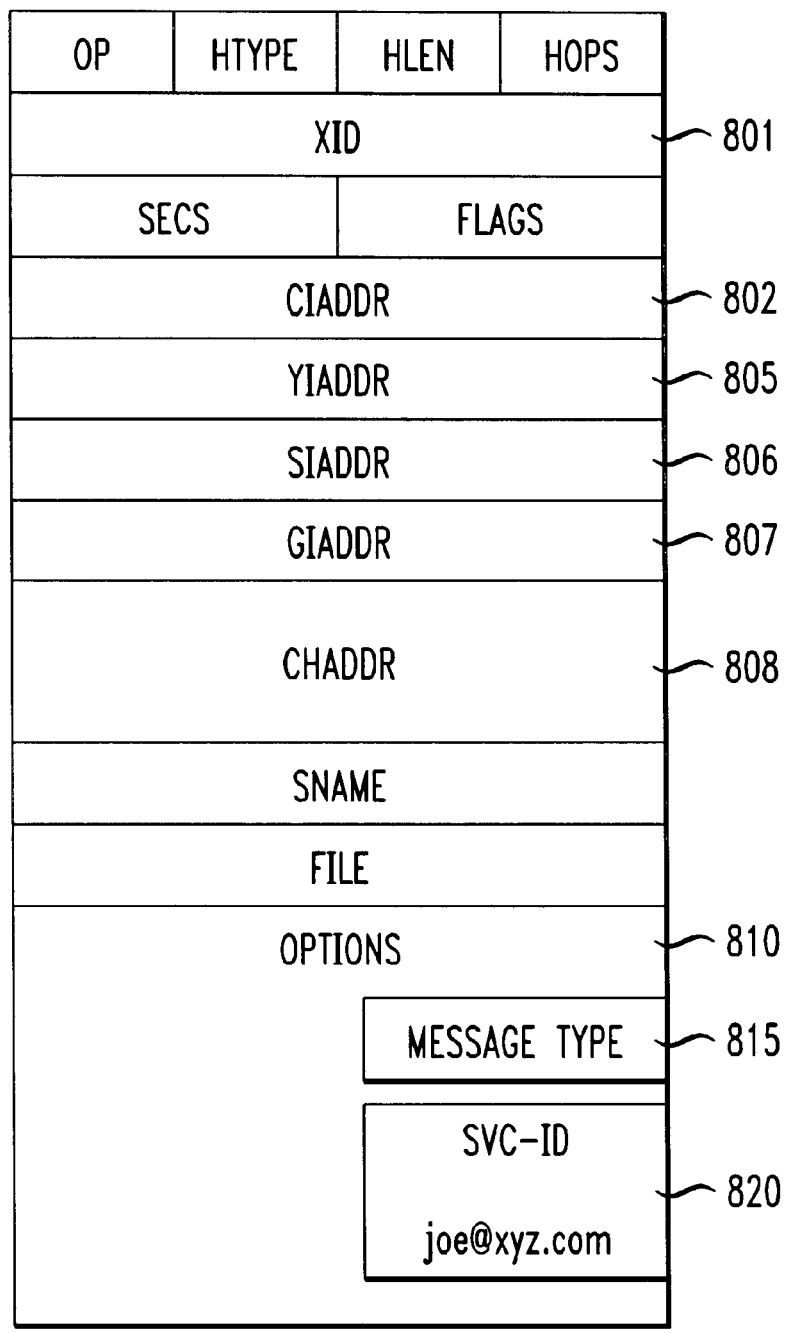
FIG. 4 is a conceptual representation of a DHCP message exchanged between the network access device and a DHCP server.

Referring now to FIG. 4, an exemplary format for a DHCP message is shown generally at 800. The message 800 comprises an xid field 801, ciaddr field 802, yiaddr field 805, siaddr field 806, giaddr field 807, chaddr field 808, and an options field 810 including a message type sub-field 815 and svc-id 820. Each DHCP message is characterized by type, such as DHCPDISCOVER, DHCPOFFER, DHCPREQUEST OR DHCPACK. The type of each DHCP message is encoded into options field 810. The options field is also used for other purposes, such as the encoding of vendor specific information in the "svc-id" field 820. Each DHCP message 800 is set to indicate whether it is being communicated from a client 101 or the DHCP server (part of the network administration system) 121. The message identification is implemented by setting the op field to BOOTREQUEST or BOOTREPLY, to respectively indicate the origin of the message. The IP address is contained in the yiaddr field 805. The chadddr field 808 contains the MAC address of the client 101.

Figure 5:
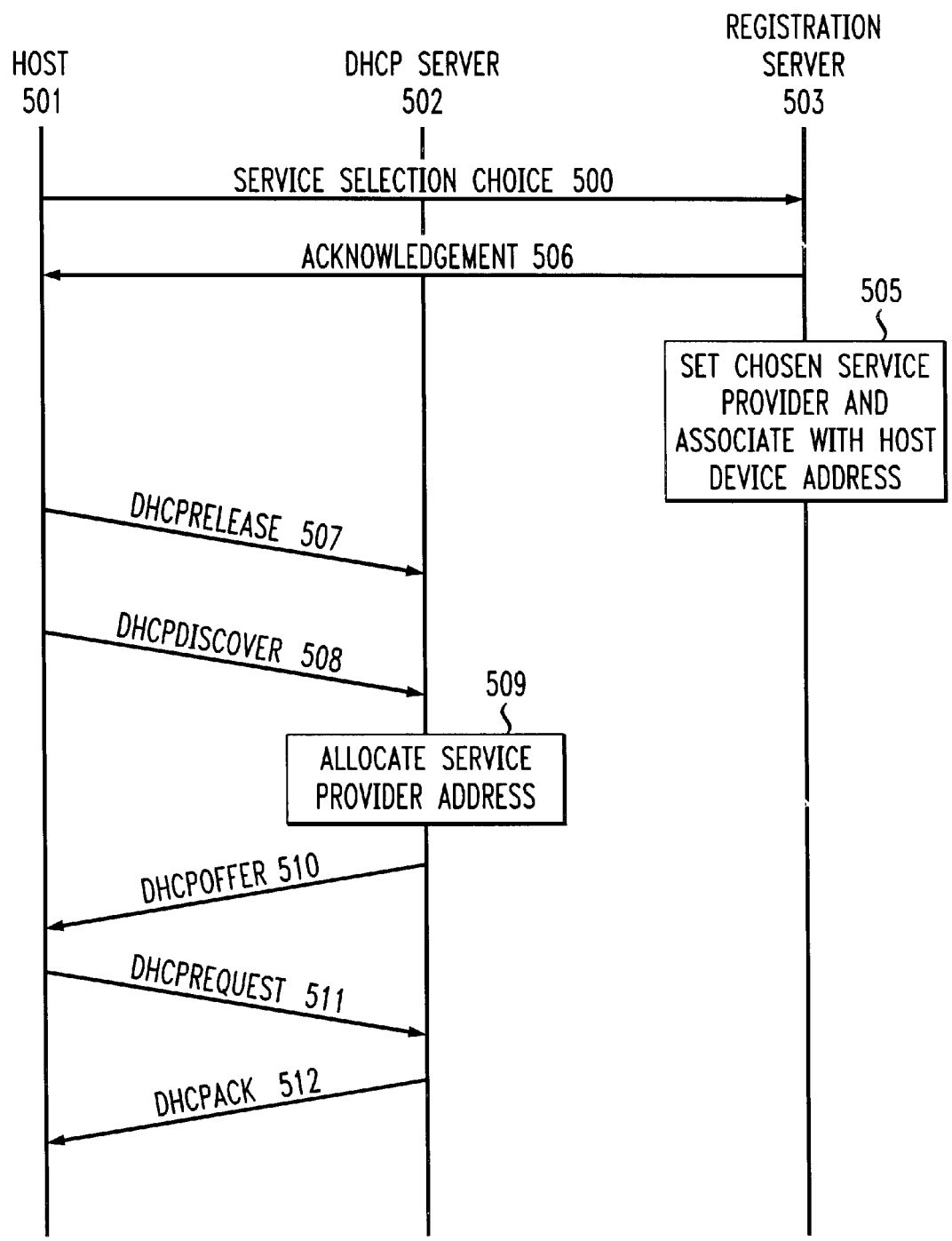
FIG. 5 is a timeline diagram of messages exchanged in the assignment of a network address associated with a particular service to a network access device, in accordance with a preferred embodiment of another aspect of the invention.

Referring now to FIG. 5, there is shown an embodiment where the subscriber registers the service selection with the registration server which temporarily establishes the association between the network access device's hardware address (e.g. the MAC address of the device) and the chosen service selection. The configuration server then uses the MAC address of the network access device to assign an IP address from the proper address space. FIG. 5 is a simplified timeline diagram of DHCP messages exchanged, in accordance with such an embodiment. At 500, the network access device 501 registers a service selection with the registration server 503. The client 501 sends a "SET ISP" message to the registration server 503. It is assumed that the subscriber has passed the proper authentication procedures for the particular service selected, either beforehand (e.g. through transactions directly with the service provider's network) or in the same session with the registration server. At 505 the registration server 503 stores the selected service and associates the service selection with the hardware device address (MAC address) of the network access device 501. It is advantageous for the DHCP server 502 to set a client class to the selected service provider with an "AUTHENTICATE UNTIL" option set to 10 minutes, to avoid assignment of the service-related IP address to another device. The registration server 503 sends an acknowledgment 506 to the network access device 501. After receiving the acknowledgment from the registration server 503, the network access device 501 releases any pre-existing address assignment by issuing a DHCPRELEASE message at 507. At 508, the network access device issues a standard DHCPDISCOVER message. The DHCP server 502 receives the DHCPDISCOVER message and, at 509, allocates an IP address from the pool of address associated with the particular service associated with the device's MAC address. The DHCP server 502 should check to see whether the current client set to ISP "AUTHENTICATE UNTIL" has not expired. At 510, the DHCP server 502 sends a DHCPOFFER message that includes the IP address in a field in the DHCP message. At 511, the network access device 501 receives the DHCPOFFER and sends out a DHCPREQUEST back to the DHCP server 502. At 512, the DHCP server 502 commits to assigning the IP address to the network access device 501, commits the binding to persistent storage, and transmits a DHCPACK message containing the configuration parameters for the device. If the DHCP server is unable to satisfy the DHCPREQUEST message, the server responds with a DHCPNAK message.

It is preferable that the DHCP servers and clients use some mutual authentication mechanism to restrict address assignment to authorized hosts and to prevent clients from accepting addresses from invalid DHCP servers. For example, the "delayed authentication" scheme described in R. Droms, W. Arbaugh, "Authentication for DHCP Messages," IETF Network Working Group, Internet Draft, <draft-ietf-dhc-authentication-_.txt>; or the Kerberos-based authentication mechanism described in K. Hornstein, T. Lemon, B. Aboba, J. Trostle, "DHCP Authentication via Kerberos V," IETF Network Working Group, Internet Draft, <draft-hornstein-dhc-kerbauth-_>; which are incorporated by reference herein. The "delayed authentication" mechanism supports mutual authentication of DHCP clients and servers based on a shared secret, which may be provisioned using out-of-band mechanisms. On the other hand, the Kerberos-based mechanisms are very well suited for inter-realm authentication, thereby supporting client mobility, i.e. a network access device could connect to a particular access network infrastructure without any prior registration with the access network. Each service network provider could securely authenticate the network access device accessing the service network from another network "realm," e.g. the access network infrastructure.

It can be seen that client software running on any single network access device 101 . . . 104 may provide a user interface for accessing several different communication network services at different times and in different browsing sessions. For example, as shown in FIG. 1, browser software running on network access device 101 may serve as a user interface for accessing both service network 151 and service network 152. Because the identity of the network services may otherwise be transparent to the user, it is important that the client running on the network access device communicate to the user the identity of the service network currently being accessed. The method of the present invention identifies the service network currently being accessed by displaying brand indicia of a service provider operating that service network in a designated screen area of the user interface.

To provide such brand identity, the service activation system 160 also includes a branding instruction server 179 with instructions database 180 containing network addresses or other location information of branding data servers such as branding data server 155, discussed below. The instruction server 179 processes requests for branding data location information relating to specific service networks such as service network 152. The branding instructions database 180 contains network addresses of branding data servers containing branding data for the available network service providers. Although the instruction server 179 and associated database 180 are illustrated as part of the service activation system 160, the function of those components may in fact physically reside in other components in the system, such as the service network 152 or a network access device 101 . . . 104.

In the exemplary embodiment, the branding data server 155 and associated branding server database 154 are addressable through access service network 152. The branding data server 155, or functional equivalent, may alternatively be located within the service activation system 160 or elsewhere. The branding data server 155 processes requests for branding data to be used in displaying brand indicia on a user interface of a client such as a browser. The requests may come from the service activation system 160 or directly from the network access devices 101 . . . 104. The specific network service provider whose branding data is managed by branding data server 155, such as network service provider 152, advantageously has access to that branding data in order to maintain and update the data.

Data contained in the branding server database 154 may include images, animation, video, audio or other multimedia files to be presented to a user through a user interface associated with client software. The branding data may also include instructions regarding when to begin and end animation of the display, or when to play audio or video clips. In the case where the client software has more than one region designated for displaying brand indicia, the branding data will contain instructions as to which graphics files are to be displayed in which region.

The branding data is associated with specific network service providers and is displayed or otherwise presented when the client software is used in conjunction with the associated specific network service provider. For example, the branding data associated with a given ISP is used to display branding indicia of that ISP in the user interface of a browser when that browser is used to access that ISP.

The operator of the relevant service network, e.g. service network 152 in FIG. 1, may desire to maintain a separate registration server, which may be the same server as branding server 155 in FIG. 1, or may be a different server. By maintaining a separate registration server, the operator retains responsibility for user authentication and authorization. The service activation system 160 can provide a proxy server configured to permit HTTP traffic only between local hosts and registration server 155 in service network 152. The service provider operating service network 152 would then be responsible for providing the appropriate registration information required for proper service selection to the service activation system 160. In this event, the service provider would also be responsible for notifying the service activation system 160 when service should be discontinued to the particular user. Alternatively, the DHCP server 161 in the service activation system 160 can interact with the registration server 155 using a back-end authentication protocol, e.g. the Remote Authentication Dial In User Service (RADIUS). See C. Rigney, A. Rubens, W. Simpson, S. Willens, "Remote Authentication Dial In User Service (RADIUS)," IETF Network Working Group, RFC 2058 (January 1997), which is incorporated by reference herein. The DHCP server can contain a RADIUS client and, thereby, leverage the large RADIUS embedded base used for dial access authentication.

Figure 6:
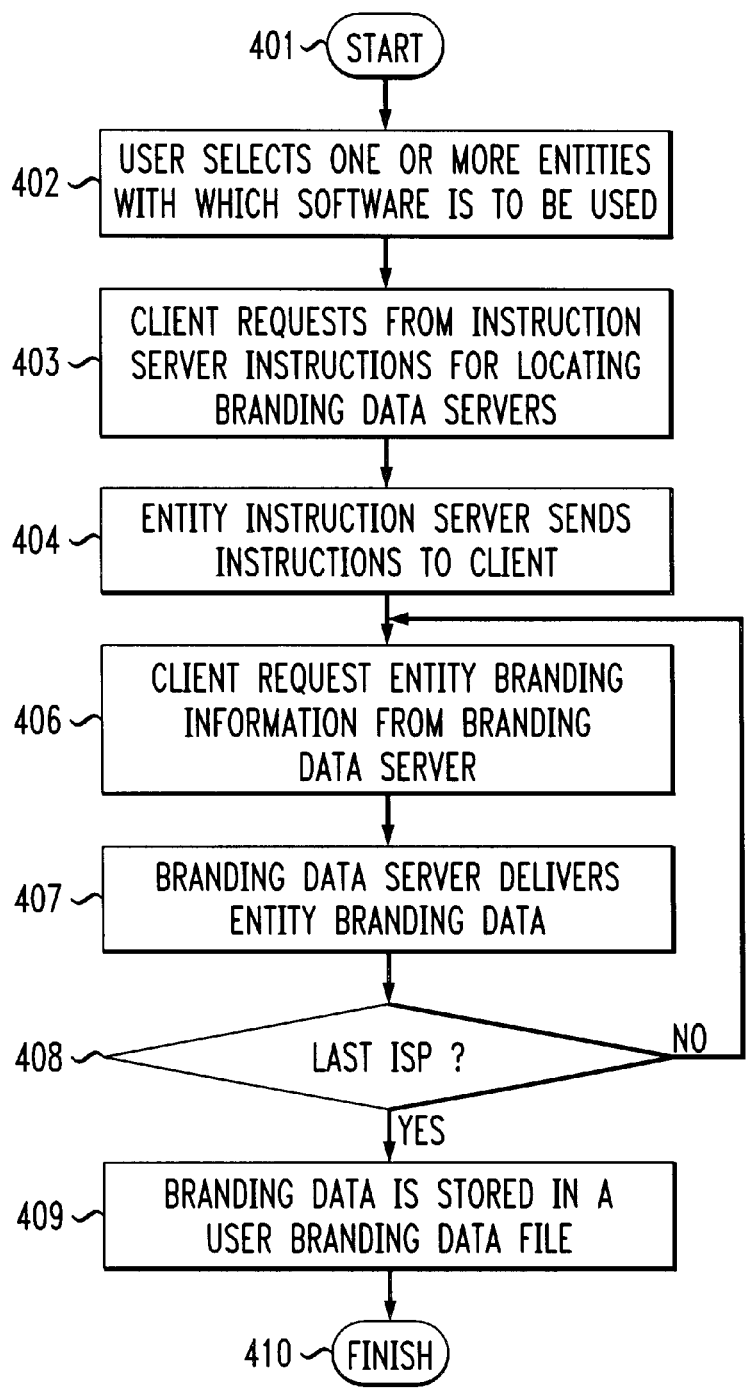
FIG. 6 is a flowchart of a configuration process performed at a network access device for selecting entities with which the client software is to be used.

The example shown in FIG. 6 illustrates how branding data is retrieved after a user initially configures the system by selecting one or more network service providers with which the client software is to be used. After starting the configuration selection process in step 401, a user selects the entities in step 402. For example, in the case of a network access device 101 (FIG. 1) running a browser and connected to an access network 120 with access to multiple network service providers such as ISP's, a user selects which of the available ISP's the user will subscribe to. The ISP's may, for example, be selected from a menu window 720 (FIG. 3) presented by the service activation system 160.

Once the user selects one or more entities for configuration, a request is sent in step 403 to the instruction server 179 (FIG. 1) for the locations of the branding servers associated with the chosen entities. The request may be sent by client software such as client browser software residing on the network access device 101, or by the service activation system 160, or by another device that has information regarding the available services and/or the choices made by the user. After receiving the request, the instruction server in step 404 replies by transmitting locations of the branding servers to, for example, the registration server 162 in the service activation system 160 or to the client software residing on the network access device 101. The request for branding server locations and the reply containing those locations may be via HTTP to facilitate communication over a network.

In the case where branding server locations of more than one network service provider are required, the requests to or replies from the instruction server may be made in a single message containing identifications of all network service providers, as illustrated by the example of FIG. 6, or may be made in serial fashion. That is, the queries may ascertain one branding server location at a time. Such an arrangement is used where the requests are made immediately after each network service provider is chosen by the user, or where a plurality of instruction servers must be queried.

After receiving the locations of one or more branding data servers from the branding instruction server, a query is made in step 406 to a branding data server to send the branding data. The query may be made by the client software residing on the network access device 101, or may be made by the service activation system 160, or by another device. In response to the query, the branding data server delivers the branding data in step 407, preferably via HTTP.

If more than one network service provider has been selected by the user for configuration, then different branding data servers may be associated with each of the network service providers, and each must be queried separately. In that case, the query process loops until branding data for all the selected entities is retrieved, as shown in step 408. Where only a single network service provider is chosen, or where branding data for all the chosen entities is stored at a single branding data server, only a single query is necessary.

In one embodiment of the invention, a single device performs the function of the instruction server 179 and the branding data server 155. In that embodiment, an instruction server file contains the locations of files containing branding data, together with a mapping of which branding data files are associated with which network service providers. Other files in the same device contain the branding data itself.

Either during or after the process of retrieving the branding data for each of the network service providers chosen by the user, the branding data is stored in step 409 for later use by the client software in displaying brand indicia of a currently-accessed entity. The data may be stored in a branding data file 166 in the service activation system 160 (FIG. 1), or alternatively in the network access device 101 or elsewhere in the system.

Figure 7:
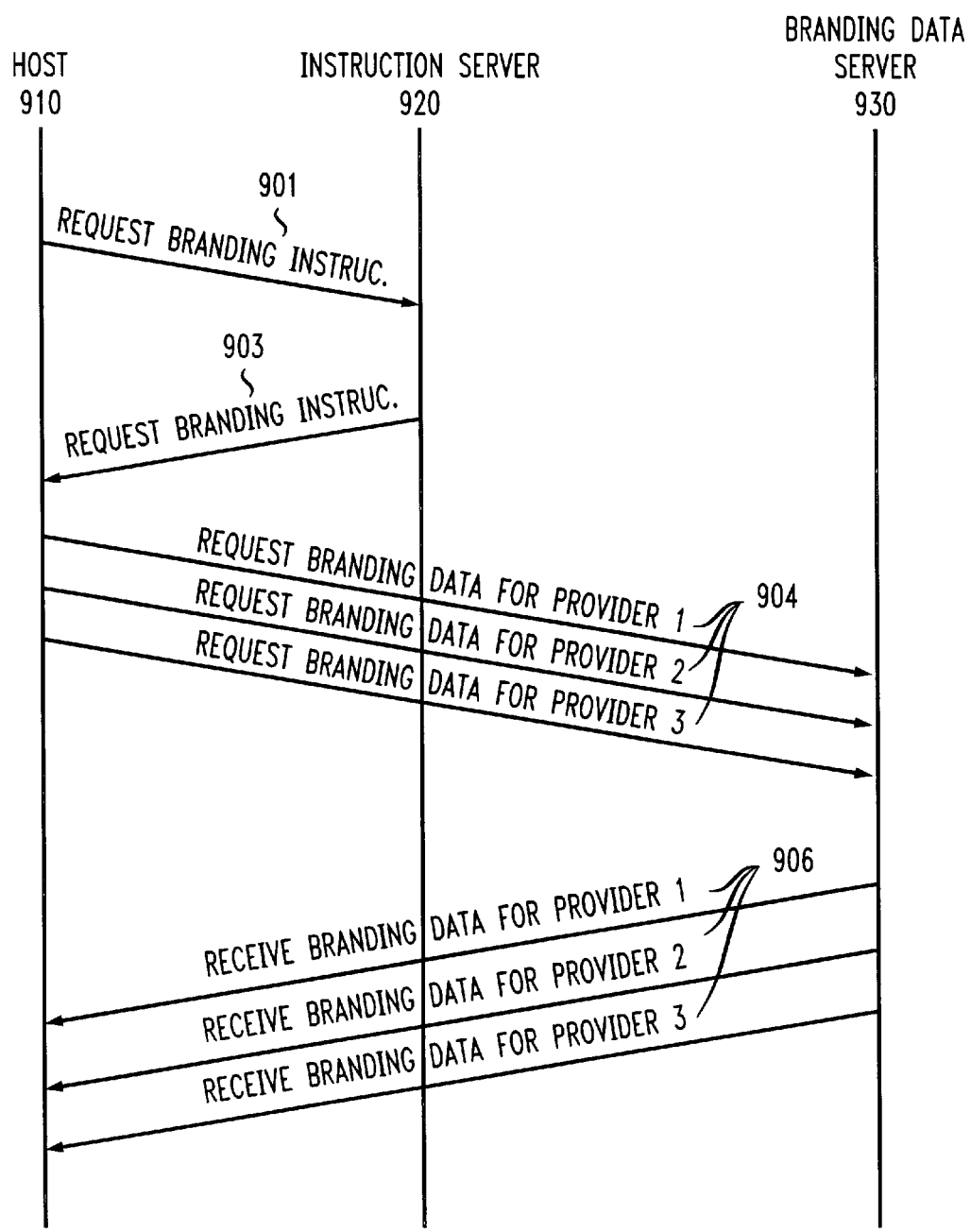
FIG. 7 is a timeline diagram of messages exchanged in configuring the system of the invention to present branding data of selected network service providers.

In an operational flow diagram for branding configuration shown in FIG. 7, the network access device (or host) 910 requests branding instructions from a branding instruction server 920 at 901. The request 901 includes the identities of the network service providers selected by the subscriber to be available for use. The request is preferably initiated by client software residing on the network access device 101 (FIG. 1), but may also originate in a component of the service activation system 160 such as the registration server 162. The instruction server 920 may be part of the service activation system 160, as is instruction server 179 (FIG. 1), or may reside within the service network 151. In response to the request 901 for branding instructions, the instruction server 920 returns branding instructions at 903. The branding instructions include locations of one or more branding data servers 930 that contain the branding data of the selected network service providers.

After the branding instructions are received and the locations of the branding data servers containing branding data for the selected network service providers are thereby known, requests 904 (FIG. 7) for branding data are sent to those branding data servers. Multiple requests 904 are sent to multiple branding data servers 930. The branding data servers 930 respond at 906 by providing branding data for presentation to the subscriber through the user interface of the client software, as described above.

FIG. 8 is a flowchart depicting the actions of the service client in accordance with an embodiment of the invention. The subscriber is logged into a profile with a working service provider's IP address, e.g., the address allocated to the user of svc-1 (151). Within a current login session, the subscriber desires to change from the active service provider—svc-1 (151) to another subscribed service provider, svc-2 (152). In accordance with a preferred embodiment of the present invention, the subscriber makes the request using the service provider manager function of the client, which will initiate a series of steps to effect a change in the IP address for network access device 101. At step 301, the user accesses the service provider manager function of the client shown generally at 720 in FIG. 3. As discussed above, the service provider manager 525 function enables the user to select a service provider from a stored list of service providers in the client. In the illustrative embodiment, the user is currently using active service provider svc-1 and desires to change to service provider svc-2. At step 302, the client 101 fetches the current account configuration data from the service activation system 160 over the access network and checks whether the stored list of subscribed 530 service providers is current. Any changes can be reconciled before displaying the selection of service providers to the user. The service activation system 160 is described above and can utilize user credentials, either explicitly requested or cached automatically, to authorize the fetching of account configuration data. If the cached credentials on the client are invalid, the attempt to update the list of configured service providers may be refused and the user alerted that the credentials need to be updated. A specialized account restoration procedure can be utilized by a properly-authorized administrative user to update the cached credentials. Alternatively, the user may ignore the message and continue using the old list of configured service providers. These options may be displayed by the client software in a manner analogous to what is commonly utilized in a dial-up connection using text-based or graphical controls.

At this point the client may, in optional step 310, retrieve entity branding data for all entities stored in the branding data file 166, for the purpose of displaying brand indicia of the service providers in menu form for selection by the user. The entities are represented in the menu by their unique branding indicia, facilitating entity identification by the user and permitting the entities to differentiate their respective services.

At step 303, the user selects an option within the service provider manager function to switch to the new service provider (svc-2). If the second service provider is not configured, then the service provider manager function 720 of the client can offer to add the new service provider. The client can be configured to automatically connect to the service activation system 160 and enable the user to interact with a service provider management feature in the service activation system 160 as well as any necessary service provider-specific registration sites. After receiving the proper configuration data and any service provider access credentials, if required by the service provider, the client can return back to step 303 in FIG. 8. At step 304, the client displays a warning with respect to switching between service providers while network applications are running. The user can then choose to either continue or cancel the operation. If the user chooses to cancel, then, at step 305, the current service provider association remains in effect and the client service provider manager function ends.

If the user chooses to continue, the client signals the service activation system 160 at step 306 for a service provider change and provides the access device's (111) physical address information, such as a MAC address as discussed above. The client will also send the subscriber's credentials, in one exemplary embodiment, to enable the service activation system to authenticate the subscriber. The service activation system (registration server 162) will check the subscriber's credentials and credit information utilizing a network-based subscription/authorization process for the various services shared on the access network infrastructure. At step 307, the client receives confirmation from the service activation system 160 that the change to the new service provider is authorized. If the authorization fails, the service activation system 160 returns an error message to the client, the existing service provider association remains in effect, and the client service provider manager function ends.

Where authorization has succeeded, and the client software in step 311 fetches from the user branding data file 166 the branding data associated with the selected entity. The branding data fetching step 311 may be unnecessary in the case where, in step 310, the client has already fetched branding data for all available service providers. On the other hand, the branding data fetched for all available entities for menu display in step 310 may be different (e.g., thumbnails) from the branding data to be displayed in the client user interface during an access session. In that case, branding data additional to that fetched in step 310 would be fetched in step 311.

At step 308, the client sends a message to a local DHCP process (controlled by network application software in the client or on a networked system) requesting that it release and renew the IP address of the access device 101 in accordance with the methodology described above. In this manner, a new IP address is assigned to the access device from the selected service provider.

At step 309, the client updates the browser interface 790 to reflect settings specific to the active service provider (e.g. svc-2), including displaying the branding information in the predetermined location in the user interface. If video, audio or other multimedia branding data is stored in the user branding data file 166, that data is presented to the user in accordance with the stored instructions. In this way, it is clear to a user which network service provider is currently being used in conjunction with the client software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to a client browser accessing the Internet through Internet Service Providers. However, the principles of the present invention could be readily extended to other client software used in conjunction with services offered by a plurality of entities. For example, searching software could be used in conjunction with a plurality of commercial databases. Such an extension could be readily implemented by one of ordinary skill in the art given the above disclosure.

What is claimed is:

1. A method of causing brand indicia of a selected network access provider to be presented through a user interface associated with client software, the software being configurable to be used in conjunction with one of a plurality of network access providers, the method comprising the steps of:
   receiving an identification of a plurality of network access providers for configuration of the client software;
   retrieving branding data containing brand indicia for the identified network access providers from at least one branding data server;
   receiving a selection of one of the identified network access providers for use in a session; and
   causing the brand indicia of the selected network access provider to be presented through the user interface of the client software according to the branding data.

2. The method as claimed in claim 1, further comprising the steps of retrieving a location of the at least one branding data server from an instruction server.

3. The method as claimed in claim 2, wherein the instruction server and the branding data server are separate servers.

4. The method as claimed in claim 1, wherein the branding data includes a screen location in the user interface where brand indicia are to be displayed.

5. The method as claimed in claim 1, wherein the brand indicia comprise multimedia information.

6. The method as claimed in claim 1, wherein the step of retrieving branding data is performed by a network access device.

7. The method as claimed in claim 1, wherein the step of retrieving branding data is performed by a service activation system.

8. The method as claimed in claim 1, further comprising the step of storing the branding data in a branding database, and wherein the step of causing the brand indicia to be presented includes retrieving the branding data from the branding database.

9. The method as claimed in claim 1, wherein the client software runs on a network access device, and further comprising the step of assigning the network access device a network address allocated by the selected one of the identified network access providers.

10. The method as claimed in claim 1, further comprising the steps of receiving a selection of a second one of the identified network access providers, and causing the brand indicia of the second selected network access provider to be presented through the user interface of the client software according to the branding data.

11. The method as claimed in claim 1, wherein the branding data is retrieved as HTML data.

12. A method of configuring a network access device having a first network address allocated to a subscriber of services of a first service provider provided by a first service network, with a new network address allocated to a subscriber of services of a second service provider provided by a second service network, wherein the network access device is connected to an access network connected to a plurality of service networks and wherein the network access device has a user interface for displaying brand indicia of a service network, comprising the steps of:
   retrieving from at least one branding data server, branding data containing brand indicia for the plurality of service networks;

sending a request from the network access device to the access network requesting a change to a second service provider;

receiving a response from the access network;

initiating a network address change request using a DHCP configuration protocol, whereby a second network address allocated to the subscriber of services of the second service provider is assigned to the network access device, the second network address being utilized by the network access device to communicate data packets to the service network providing the selected service, and presenting through the user interface brand indicia of the second service provider.

13. The method as claimed in claim 11, further comprising the step of retrieving a location of the at least one branding data server from an instruction server.

14. The method as claimed in claim 12, wherein the instruction server and the branding data server are separate servers.

15. The method as claimed in claim 11, wherein the branding data is retrieved as HTML data.

16. The method as claimed in claim 11, further comprising the step of storing the branding data in a branding database, and wherein the step of presenting the brand indicia includes retrieving the branding data from the branding database.

17. The method as claimed in claim 11, wherein the branding data includes a screen location in the user interface where brand indicia are to be displayed.

18. The method as claimed in claim 11, wherein the brand indicia comprise multimedia information.

* * * * *